March 13, 1945.    E. L. FROWNFELTER    2,371,288
THERMOCOUPLE ASSEMBLY
Filed March 6, 1942
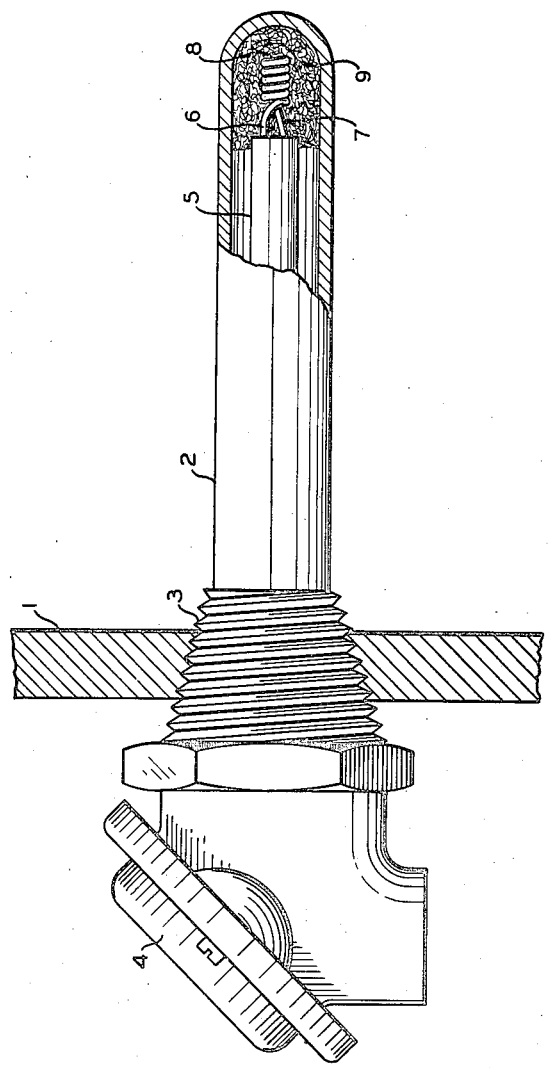
INVENTOR.
EDGAR L. FROWNFELTER
BY
ATTORNEY Patented Mar. 13, 1945

2,371,288

UNITED STATES PATENT OFFICE 2,371,288

THERMOCOUPLE ASSEMBLY

Edgar L. Frownfelter, Philadelphia, Pa., assignor to The Brown Instrument Company, Philadelphia, Pa., a corporation of Pennsylvania Application March 6, 1942, Serial No. 433,621

4 Claims. (Cl. 136—4)

The present invention relates to thermocouples and is more particularly directed to a thermocouple assembly in which it is not necessary to have the thermocouple of some particular length in order to get maximum thermal conductivity between the heated space and the hot junction of the thermocouple.

Normally it is necessary that a thermocouple which is used in a protecting tube be so formed that the hot junction of the couple is in engagement with the end of the protecting tube. This means that the thermocouple wires, and the insulating members which are normally placed around these wires, must be formed of some exact length so that they can be placed in the protecting tube in engagement with the bottom of the same without the necessity of bending the thermocouple wires. In some installations such as Diesel engines where there are a good many thermocouples used, the expense of insuring that each thermocouple is exactly the same length as each other one increases the price of these installations considerably. With my invention, however, the same degree of accuracy and speed of response is possible with thermocouples that are not exactly the same length and do not touch the end of the protecting tube as those that have been accurately made to engage the protecting tube.

In accordance with my invention a thermocouple assembly consisting of a protecting tube and a thermocouple therein with a mass of some resilient fibrous material of high heat conductivity such as steel wool placed between the two is used to measure the temperature of some heated space. By inserting a mass of material such as steel wool in the bottom of the protecting tube and then placing the thermocouple in the tube with its hot junction against the material a high degree of heat conductivity or small lag can be obtained in the assembly. In view of the fact that the steel wool is resilient and has good heat conducting characteristics the thermocouple can be of varying lengths and still, by engaging the wool, be subjected to the same temperature as the outside of the protecting tube.

It is, therefore, an object of my invention to provide a thermocouple assembly in which some resilient heat conducting material is inserted between the protecting tube and the hot junction of the thermocouple. It is a further object of my invention to provide an assembly in which a maximum heat transfer is obtained in a given protected installation without the necessity of forming the thermocouples of exactly the same length.

The various features of novelty which characterize this invention are pointed out with particularity in the claims annexed to and forming a part of this specification. For a better understanding of the invention, however, its advantages and specific objects obtained with its use, reference should be had to the accompanying drawing and descriptive matter in which is illustrated and described a preferred embodiment of the invention.

The single sheet of drawings shows the wall 1 of some heated space whose temperature is to be measured by a thermocouple. To this end a protecting tube 2 for a thermocouple is inserted through an opening in the wall 1 and is fastened in place by means of screw threads 3 formed on the neck of the protecting tube. To the left of the threads there is attached a standard thermocouple head 4 in which there are provided terminals to connect the thermocouple wires with the lead wires in any usual or standard manner. Extending through the protecting tube 2 from the head 4 is an insulating member 5 that is used to support the wires 6 and 7 that form the thermocouple. These wires are joined at their ends to form a hot junction 8. Snugly received between the protecting tube and the hot junction is a tightly massed wad 9 of some resilient fibrous material having good heat conducting properties, such as will be in good heat transfer relation with the end of the protecting tube.

Ordinarily in making thermocouples that are to be inserted into protecting tubes it is necessary to cut the wire and the insulating members to some particular length so that the tip or hot junction will be firmly in engagement with the protecting tube. If the wires are too long they will be bent and the insulating members will probably be cracked. If the wires are too short a dead air space of low heat conductivity will occur between the thermocouple and protecting tube to slow down the response of the thermocouple to changes in the temperature being measured. On the other hand it is both difficult and costly to manufacture thermocouples of exactly the same length. The wad of resilient material placed in the end of the protecting tube and engaging the thermocouple serves to act as a heat conducting medium between the tube and the thermocouple. Because the material is resilient, thermocouples of various lengths may be placed in the protecting tube and a good heat conducting path will still be formed between the two.

In this fashion any possibility of a dead air space is obviated and it is not necessary to cut the thermocouple wires and the insulating members 5 to some exact length.

While in accordance with the provisions of the statutes, I have illustrated and described the best form of this invention now known to me, it will be apparent to those skilled in the art that changes may be made in the form of the apparatus disclosed without departing from the spirit of the invention as set forth in the appended claims, and that in some cases certain features of this invention may sometimes be used to advantage without a corresponding use of other features.

Having now described this invention, what I claim as new and desire to secure by Letters Patent is:

1. The combination with a protecting tube and a thermocouple inserted in said protecting tube, of means to assist in heat transfer between the thermocouple and protecting tube comprising a mass of steel wool inserted in the protecting tube to fill any space between the thermocouple and protecting tube.

2. A thermocouple assembly comprising in combination a protecting tube, a thermocouple inserted in said protecting tube with its hot junction adjacent the end of the protecting tube and a mass of resilient fibrous metallic material having good heat-conducting qualities between said protecting tube and thermocouple to transfer heat between the same.

3. A thermocouple assembly comprising a protecting tube inserted into a heated space, a thermocouple having a hot junction inserted in said protecting tube with the hot junction adjacent the end of the protecting tube, and a quantity of steel wool inserted between the said hot junction and the protecting tube end.

4. A thermocouple assembly of the type used in measuring temperatures in a heated enclosure comprising a tubular protecting tube having one end closed and inserted in said enclosure, a thermocouple having a hot junction and of a length approximately equal to that of the protecting tube and inserted in the same, the hot junction of the thermocouple lying adjacent the closed end of the protecting tube, and a cushion of steel wool inserted between said hot junction and said closed end of the protecting tube.

EDGAR L. FROWNFELTER.